(12) United States Patent
Thomczyk et al.

(10) Patent No.: US 9,187,251 B2
(45) Date of Patent: Nov. 17, 2015

(54) CONVEYING INSTALLATION WITH IMPROVED ENERGY REQUIREMENTS

(71) Applicant: ContiTech Transportbandsysteme GmbH, Hannover (DE)

(72) Inventors: Andrea Thomczyk, Goettingen (DE); Frank Kantorek, Lehrte (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/533,851

(22) Filed: Nov. 5, 2014

(65) Prior Publication Data

US 2015/0053536 A1   Feb. 26, 2015

Related U.S. Application Data

(63) Continuation of application No. PCT/EP2013/059096, filed on May 2, 2013.

(30) Foreign Application Priority Data

May 7, 2012   (DE) .......................... 10 2012 103 963

(51) Int. Cl.
| | |
|---|---|
| *B65G 17/36* | (2006.01) |
| *B65G 15/56* | (2006.01) |
| *B65G 15/42* | (2006.01) |
| *B65G 15/28* | (2006.01) |

(52) U.S. Cl.
CPC ................ *B65G 15/56* (2013.01); *B65G 15/28* (2013.01); *B65G 15/42* (2013.01)

(58) Field of Classification Search
CPC .................. B65G 2812/02534; B65G 2201/04; B65G 17/42; B65G 17/065; B65G 29/02
USPC ........................................ 198/714, 716, 844.1
See application file for complete search history.

(56) References Cited

U.S. PATENT DOCUMENTS

| | | | |
|---|---|---|---|
| 3,319,776 A | | 5/1967 | Bechtloff et al. |
| 3,750,864 A | * | 8/1973 | Nolte ............................ 198/707 |
| 4,177,891 A | * | 12/1979 | Delfosse ....................... 198/570 |
| 5,660,266 A | * | 8/1997 | Nolte ............................ 198/711 |
| 5,975,283 A | * | 11/1999 | Riffe ............................. 198/607 |
| 6,024,209 A | | 2/2000 | Nolte |
| 6,571,935 B1 | * | 6/2003 | Campbell et al. .......... 198/690.2 |
| 2006/0237378 A1 | | 10/2006 | Pellegrino et al. |

FOREIGN PATENT DOCUMENTS

| | | |
|---|---|---|
| DE | 1 182 143 B | 11/1964 |
| DE | 7019776 U | 9/1970 |

(Continued)

OTHER PUBLICATIONS

International Search Report dated Jul. 12, 2013 of international application PCT/EP2013/059096 on which this application is based.

*Primary Examiner* — James R Bidwell
(74) *Attorney, Agent, or Firm* — Walter Ottesen P.A.

(57) ABSTRACT

A conveying installation has a conveying belt, comprising at least one side wall, constructed from in each case one polymer material with elastic properties, and/or at least one cleat, constructed from in each case one polymer material with elastic properties, and also having drums, load-bearing rollers and load-bearing frameworks, wherein the conveying installation forms a material-conveying upper strand, with a supply location for the conveying material, and an at least material-free lower strand. In the conveying installation at least one side wall and/or at least one cleat of the conveying belt contain/contains at least one foamed polymer mix.

5 Claims, 2 Drawing Sheets

(56) References Cited

FOREIGN PATENT DOCUMENTS

| | | |
|---|---|---|
| DE | 38 35 619 A1 | 4/1990 |
| DE | 10 2008 013 571 A1 | 10/2009 |
| DE | 10 2008 037 457 A1 | 4/2010 |
| DE | 10 2008 055 482 A1 | 6/2010 |
| DE | 10 2009 043 504 A1 | 3/2011 |
| FR | 1070222 A | 7/1954 |
| GB | 1541722 A | 3/1979 |

\* cited by examiner

CONVEYING INSTALLATION WITH IMPROVED ENERGY REQUIREMENTS

CROSS REFERENCE TO RELATED APPLICATIONS

This application is a continuation application of international patent application PCT/EP2013/059096, filed May 2, 2013, designating the United States and claiming priority from German application 10 2012 103 963.1, filed May 7, 2012, and the entire content of both applications is incorporated herein by reference.

FIELD OF THE INVENTION

The invention relates to a conveying installation having a conveying belt comprising at least one side wall constructed from in each case at least one polymeric material with elastic properties and/or at least one cleat constructed from in each case at least one polymeric material with elastic properties, and also, furthermore, having drums, carrying rollers and having carrying structures, the conveying installation forming a materials-conveying upper strand with a charging location for the conveyed materials, and a usually materials-free lower strand. There are, however, also conveying installations which additionally are loaded in the lower strand.

BACKGROUND OF THE INVENTION

Conveying installations having endlessly self-contained conveying belts are well known.

Conveying belts, often also referred to as belt conveyors, transport bulk goods either using a depression-like implementation, as known from DE 10 2008 037 457 A1 or DE 7019776, for example, or using right-hand-side and left-hand-side side walls (edge profile strips), which are affixed substantially perpendicularly on the carrying side of the conveying belt, as known from DE 10 2008 013 571 A1, for example, and/or using what are called cleats (lugs), as known from U.S. Pat. No. 6,024,209 or DE3835619C2, for example.

The side walls of a conveying belt are often in the form of a corrugated or undulating edge; see description, for example, in DE 10 2008 055 482 A1. This ensures that in spite of the often relatively high side walls, the conveying belt, at the two end points of the transport section, can be guided without damage around the diverting drum located there. The side walls in this case are not elongated and planar, but are instead in a corrugated (undulating, snaking) form and are affixed on the conveying belt on its lengthwise sides. As a result of this design, there is sufficient side wall material to prevent tearing caused by the stretching of the side wall during diversion. They usually have an elastic all-rubber layer with or without fabric inserts. Conveying belts with undulating edges are used preferably for transporting bulk goods. In the case of ascending conveyors in particular, cleats, preferably transverse cleats, prevent the conveyed goods slipping. In the case of linear conveying belts, the cleats are also used as a separation between piece goods. The cleats here may be equipped with or without additional fabric insert.

As a result of the undulating edges, the useful physical cross section (that is, the cross-sectional filling area and hence the conveying volume) of the conveying belt is increased. Undulating edges and cleats, with and without a foot in each case, are usually glued, welded or vulcanized onto the conveying belt. The cleats are preferably applied transversely to the conveying direction.

Conveying belts having undulating edges and/or cleats are particularly suitable for being able to convey piece goods and bulk goods steeply (up to 90°), since in this case, alternatively, effective side sealing is ensured and the conveyed goods are unable to slip to the side and/or downward.

Because of the undulating geometry, the amount of material needed particularly for the undulating edges is comparatively high. This high level of material needed also results in a high overall weight for the conveying belt.

The application of cleats, too, increases the overall weight of the conveying belt.

SUMMARY OF THE INVENTION

It is an object of the invention to provide a conveying installation whose conveying belt is distinguished by a further reduction in overall weight and, consequently, by a further optimization in costs and reduced energy consumption in operation of the conveying installation.

This object is achieved by at least one side wall of the conveying belt comprising at least one foamed polymer mixture and/or at least one cleat of the conveying belt comprising at least one foamed polymer mixture.

It has been found that the overall weight of the conveying belt can be reduced significantly if at least one side wall and/or at least one cleat in each case comprises at least one foamed polymer mixture or, more preferably, consists of at least one foamed polymer mixture. As a result of this, surprisingly, the other properties of the conveying belt and hence of the conveying installation as a whole are not further negatively impacted.

The terms "polymer mixture" and "rubber mixture" are used synonymously.

The invention is suitable in principle for all conveying installations and conveying belts. In the case in particular of conveying belts having undulating edges or having a comparatively large number of, or large-volume, cleats, in view of the large quantity of material required, a particularly effective reduction in weight can be achieved.

In a preferred embodiment, at least one side wall comprises at least one foamed polymer mixture and/or that at least one cleat comprises at least one foamed polymer mixture. This means that the side wall and/or the cleat may consist only of at least one foamed layer. It is also possible, however, for the side wall and/or the cleat to possess a laminated construction, with at least one layer consisting of at least one foamed polymer mixture. In this case, the further layers may be constructed from unfoamed rubber mixtures or may take the form of a textile ply, composed of a fabric, for example.

The cleat may take the geometric form, preferably, of a standard T cleat, block T cleat, inclined C cleat, offset TC cleat, wedge guide strip, or another common form.

If the side wall and/or cleat is of laminated construction and there is at least one further layer of an unfoamed rubber mixture, the qualitative and/or quantitative composition of the foamed polymer mixture, apart from the required expandants, is in this case preferably the same as or different from the compositions of the unfoamed rubber mixture(s).

Where a textile ply is present, in particular in the form of a fabric, the material is preferably selected from the group consisting of cotton and/or polyamide and/or polyester and/or aramid and/or glass and/or basalt and/or steel. The stated materials may be used alone or in the form of hybrid fabrics constructed from at least one of the stated materials. Of particular significance here is a polyamide/polyester fabric.

The rubber for the foamed polymer mixture is selected from the group consisting of natural rubber (NR) and/or butadiene rubber (BR) and/or chloroprene rubber (CR) and/or styrene-butadiene rubber (SBR) and/or nitrile rubber (NBR) and/or butyl rubber (IIR) and/or ethylene-propylene rubber (EPM) and/or ethylene-propylene-diene rubber (EPDM) and/or polyacrylate rubber (ACM) and/or polyurethane (PU) and/or epichlorohydrin rubber (ECO) and/or chlorosulfonated polyethylene rubber (CSM) and/or silicone rubber (MVQ) and/or fluoro rubber (FPM). The stated rubbers may be used here alone or in a blend.

Of particular importance to date has been CR, which is distinguished by high flame retardance, weathering resistance, and aging resistance, especially for conveying belts for service in below-ground mining. In above-ground mining, furthermore, NR and also the abovementioned blends (DE 10 2009 043 904 A1) have acquired substantial importance.

It is also possible, however, for the side wall and/or cleat to comprise at least one foamed thermoplastic rubber, that is, a thermoplastic polymer (TP, TPE, TPU, et cetera). This may be used as a blend with those mentioned above. Furthermore, the foamed polymer mixture may comprise at least one filler in the customary quantities. In this case it is possible to use all of the fillers known to the skilled person, such as, for example, silica, carbon black, mica, carbon nanotubes, silicates, aluminum hydroxide, talc, chalk, et cetera.

Also possible is the use of all other adjuvants known to the skilled person, such as pigments, plasticizers, antiozonants, and aging inhibitors.

The foamed layer is generally vulcanized using peroxide, such as if EPDM is used as rubber component, for example, or else by sulfur vulcanization, when using NR, BR, or SBR, or else using bisphenol, when using, for example, FPM.

The foamed polymer mixture further comprises at least one expandant. Expandants are typically pore-forming blowing agents such as azo and diazo compounds, for example, which release gases (for example, $N_2$ or $CO_2$) under the influence of heat or catalysts and therefore serve for production of foamed polymer mixtures. These expandants decompose at a defined temperature during processing, to form gas, or on addition of volatile solvents during polymerization and/or vulcanization. Foaming in that case takes place either on departure from the extrusion die, that is, by vulcanization in a UHF (microwave) hot air unit, or injection molding, or in open molds. It has been found preferable to use expandants, particularly expandants based on at least one acrylonitrile polymer, available for instance under the tradename Expancel®.

It is possible, furthermore, if needed, to add foam stabilizers.

The side walls and/or cleats may, furthermore, also comprise the additional following components: conductor loops, transponders, barcodes, a polymer matrix with incorporated detectable particles, or other detectable elements.

Further components of a conveying installation may be as follows:
diverting rollers or diverting drums
hold-down rollers in the case of pipe conveying belt installations
correction rollers, in particular in the case of pipe conveying belt installations
chutes at the charging location for the conveyed material
monitoring devices.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
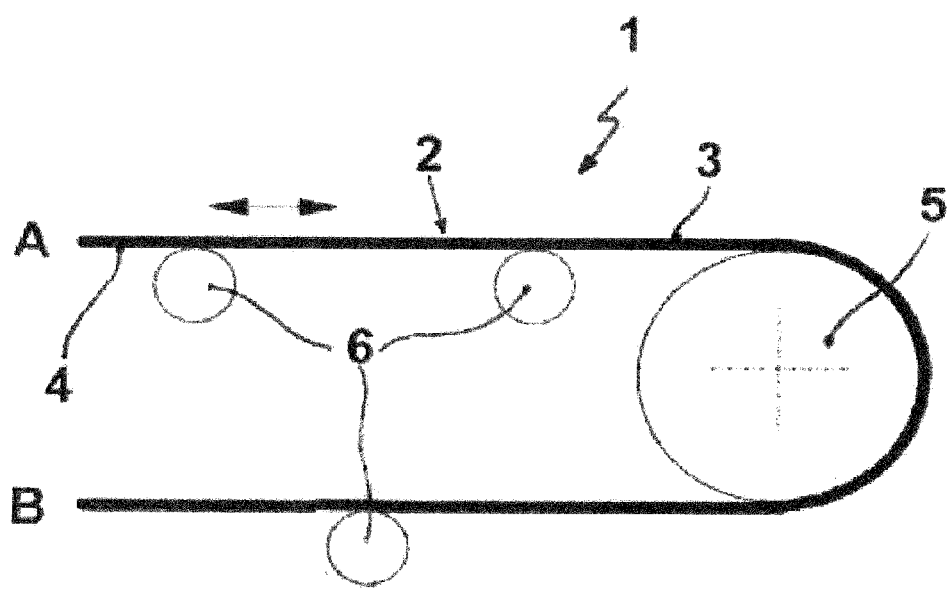
FIG. 1 shows a conveying installation having a conveying belt, a drum, and carrying rollers.

FIG. 1 shows a conveying installation 1 having a conveying belt 2, comprising a carrying-side outer sheet 3 for the conveyed material and a running-side outer sheet 4, composed in each case of a polymeric material with elastic properties, as for example of a vulcanized rubber mixture based on CR, and also having an embedded tension member, in the form of steel cables, for example. The running-side outer sheet 4 has contact with a drum 5, which may be the drive drum or reversing drum, and is also supported, within the upper strand A and lower strand B, on carrying rollers 6 in the form of a carrying-roller system. The direction in which the conveying belt 2 runs is shown by the arrow direction.

Figure 2:
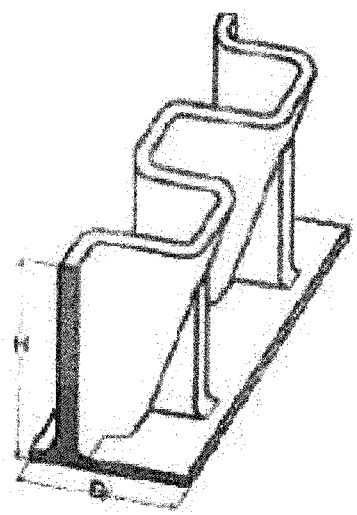
FIG. 2 shows an undulating edge.

FIG. 2 shows a cross section through an undulating edge which comprises at least one foamed polymer mixture.

Figure 3A:
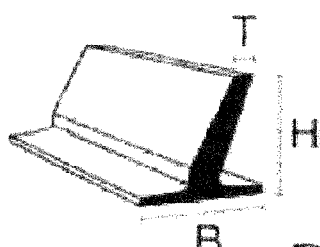
FIGS. 3A to 3D show different forms of cleat.

FIG. 3A shows an inclined C cleat having width B, height H, and depth T.

Figure 3B:
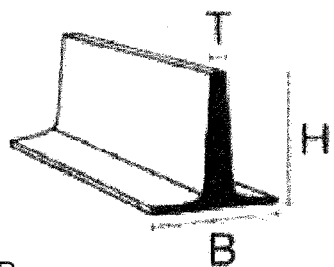

FIG. 3B shows a standard T cleat having width B, height H, and depth T.

Figure 3C:
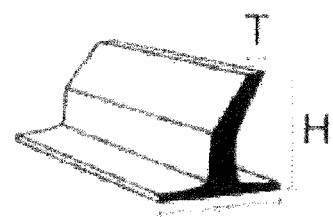
Figure 3D:
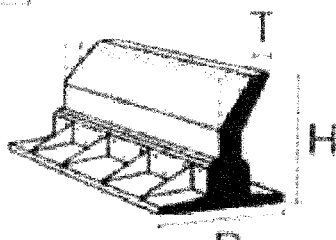

FIGS. 3C and 3D show offset TC cleats having width B, height H, and depth T.

It is understood that the foregoing description is that of the preferred embodiments of the invention and that various changes and modifications may be made thereto without departing from the spirit and scope of the invention as defined in the appended claims.

LIST OF REFERENCE SYMBOLS (Part of the Description)
1 conveying installation
2 conveying belt
3 carrying-side outer sheet
4 running-side outer sheet
5 drum (drive drum, reversing drum)
6 carrying rollers
A upper strand
B lower strand
H height of the undulating edge
D diameter of the undulating edge

What is claimed is:
1. A conveying installation comprising:
a plurality of drums;
a plurality of carrying rollers;
a carrying structure; and,
a conveying belt having at least one of a side wall constructed from a polymeric material with elastic properties and a cleat constructed from a polymeric material with elastic properties;
the conveying installation forming a materials-conveying upper strand (A) with a charging location for the conveyed materials; and,
a usually materials-free lower strand (B),
wherein at least the side wall or the cleat includes at least one foamed polymer mixture, and
wherein the foamed polymer mixture comprises a rubber selected from the group consisting of natural rubber (NR), butadiene rubber (BR), chloroprene rubber (CR), styrene-butadiene rubber (SBR), nitrile rubber (NBR), butyl rubber (IIR), ethylene-propylene rubber (EPM), ethylene-propylene-diene rubber (EPDM), polyacrylate rubber (ACM), epichlorohydrin rubber (ECO), chloro- sulfonated polyethylene rubber (CSM), silicone rubber (MVQ), and fluoro rubber (FPM) or a mixture thereof.

2. The conveying installation as claimed in claim 1, wherein the foamed polymer mixture comprises a rubber selected from the group consisting of EPDM, NR, SBR, NBR, CR, ACM, ECO, CSM, MVQ, and FPM or a mixture thereof.

3. The conveying installation as claimed in claim 1, wherein the side wall includes the at least one foamed polymer mixture.

4. The conveying installation as claimed in claim 1, wherein the cleat includes the at least one foamed polymer mixture.

5. The conveying installation as claimed in claim 1, wherein the side wall is provided in the form of an undulating edge.

\* \* \* \* \*